J. L. SAYLOR.
WEIGHING SCALE.
APPLICATION FILED JULY 24, 1911.

1,080,237.

Patented Dec. 2, 1913.
6 SHEETS—SHEET 1.

WITNESSES
G. E. Sorensen
C. H. Rehfuss

INVENTOR
JOHN L. SAYLOR
BY Paul & Paul
ATTORNEYS.

J. L. SAYLOR.
WEIGHING SCALE.
APPLICATION FILED JULY 24, 1911.

1,080,237.

Patented Dec. 2, 1913.
6 SHEETS—SHEET 3.

WITNESSES
G. E. Sorensen
C. H. Rehfuss

INVENTOR
JOHN L. SAYLOR.
By Paul & Paul
ATTORNEYS.

J. L. SAYLOR.
WEIGHING SCALE.
APPLICATION FILED JULY 24, 1911.
1,080,237.
Patented Dec. 2, 1913.
6 SHEETS—SHEET 4.
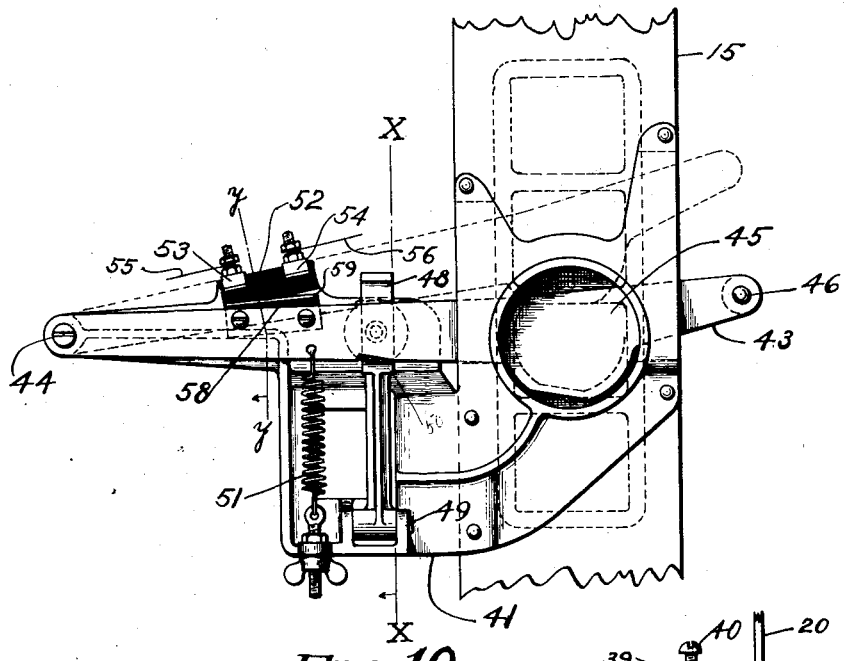
FIG. 10
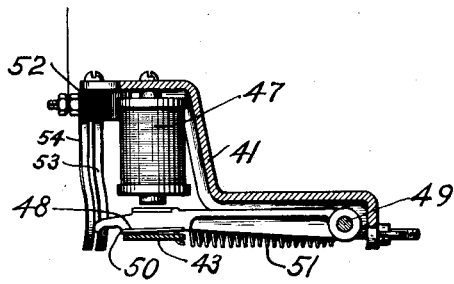
FIG. 11
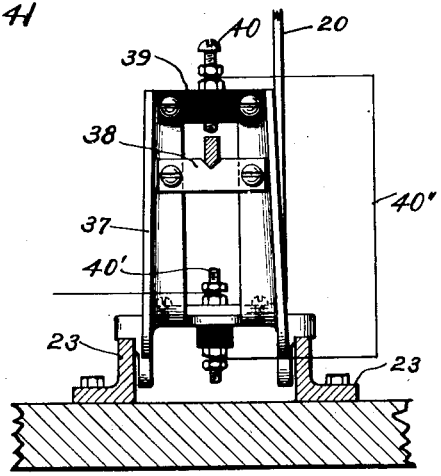
FIG. 12
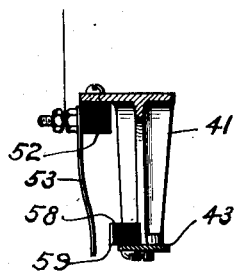
WITNESSES       FIG. 13            FIG. 14   INVENTOR
G. E. Sorensen                              JOHN L. SAYLOR.
C. H. Rehfuss                          BY  Paul & Paul
                                              ATTORNEYS WITNESSES
G. E. Sorensen
C. H. Rehfuss INVENTOR
JOHN L. SAYLOR
By Paul & Paul
ATTORNEYS J. L. SAYLOR.
WEIGHING SCALE.
APPLICATION FILED JULY 24, 1911.
1,080,237.
Patented Dec. 2, 1913.
6 SHEETS—SHEET 6.
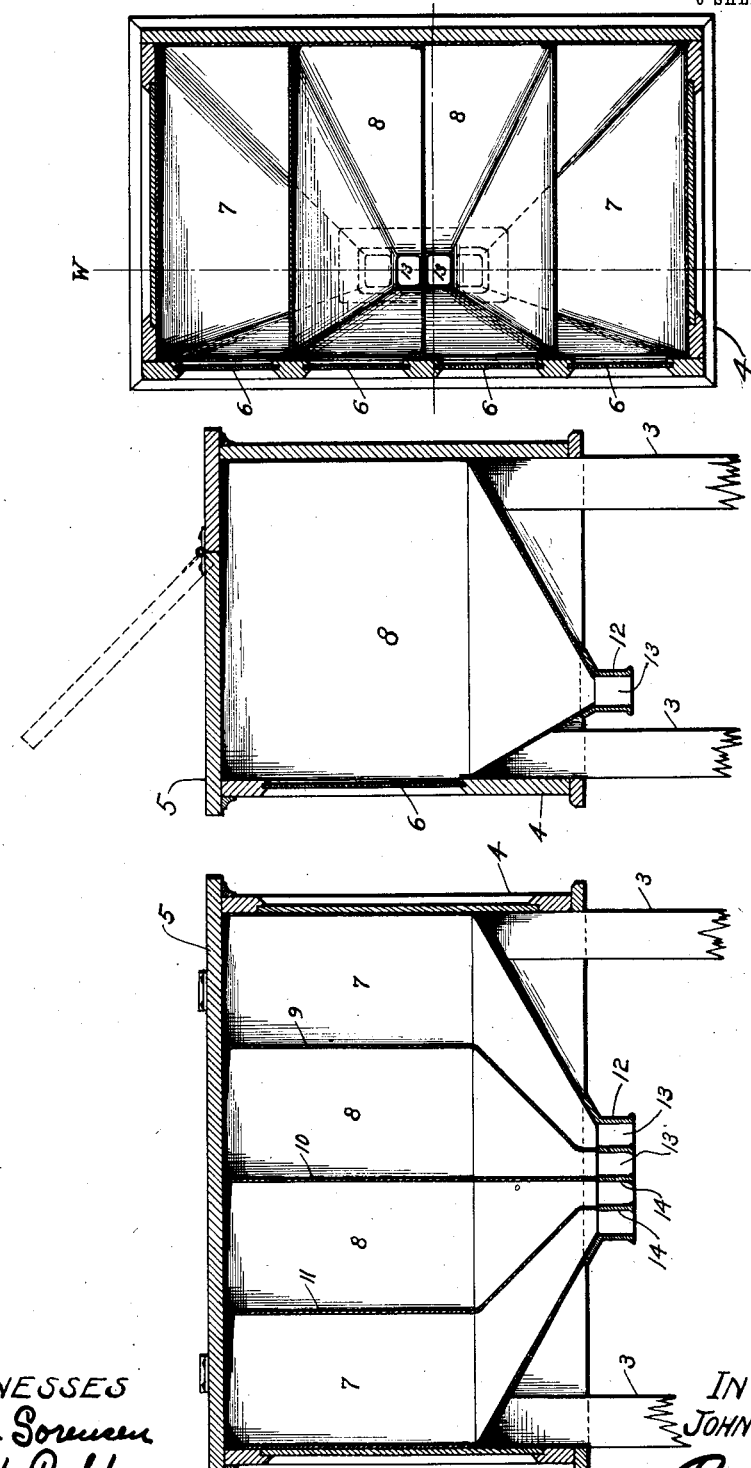

UNITED STATES PATENT OFFICE.

JOHN L. SAYLOR, OF MINNEAPOLIS, MINNESOTA.

WEIGHING-SCALE.

1,080,237.  Specification of Letters Patent. Patented Dec. 2, 1913.

Application filed July 24, 1911. Serial No. 640,285.

*To all whom it may concern:*

Be it known that I, JOHN L. SAYLOR, of Minneapolis, Hennepin county, Minnesota, have invented certain new and useful Improvements in Weighing-Scales, of which the following is a specification.

My invention relates to scales designed particularly for use in a grocery or general store to allow such articles as tea, coffee and other merchandise sold by weight to be quickly and accurately weighed.

The invention consists generally in means for regulating the cross sectional area of the hopper discharge openings to increase or decrease the flow of the material sold therethrough.

Further the invention consists in improved means for tripping the valve or shutter when a predetermined quantity has been discharged from the hopper.

Further the invention consists in an electric circuit arranged to be closed by the tilting of the scale beam and having means for automatically breaking the circuit in case the clerk should temporarily neglect to remove the filled scoop from the scale.

Further the invention consists in a slide having a discharge opening and means for moving the slide back and forth beneath the hopper openings.

Further the invention consists in an improved form of scale beam particularly adapted for work of this kind.

Further the invention consists in various constructions and combinations, all as hereinafter described and particularly pointed out in the claims.

Figure 2:
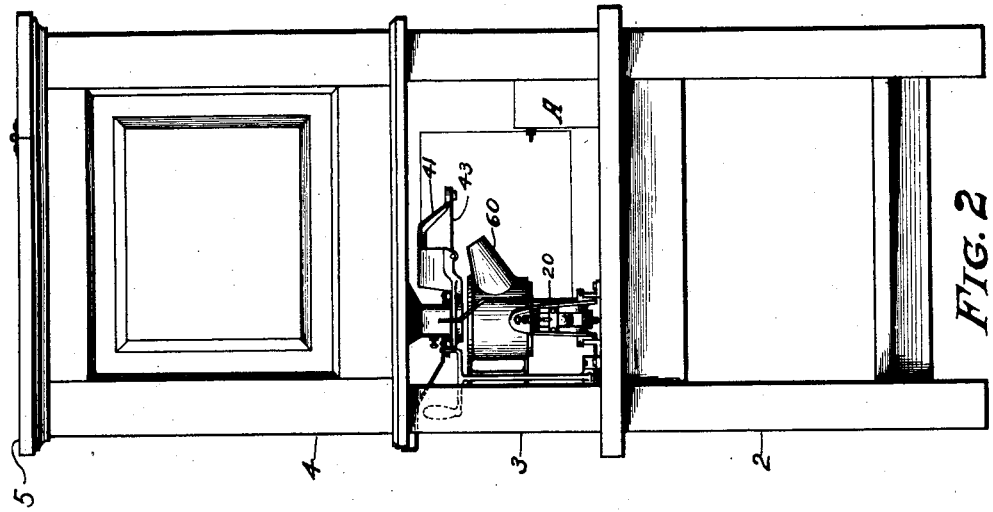
Figure 1:
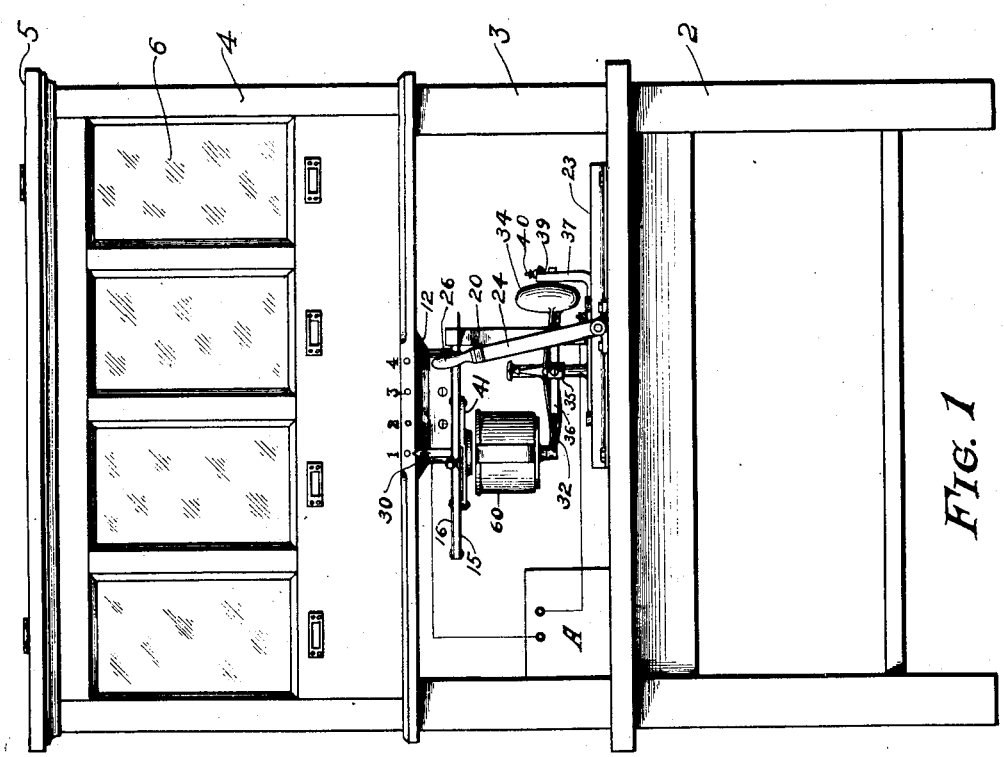
Figure 3:
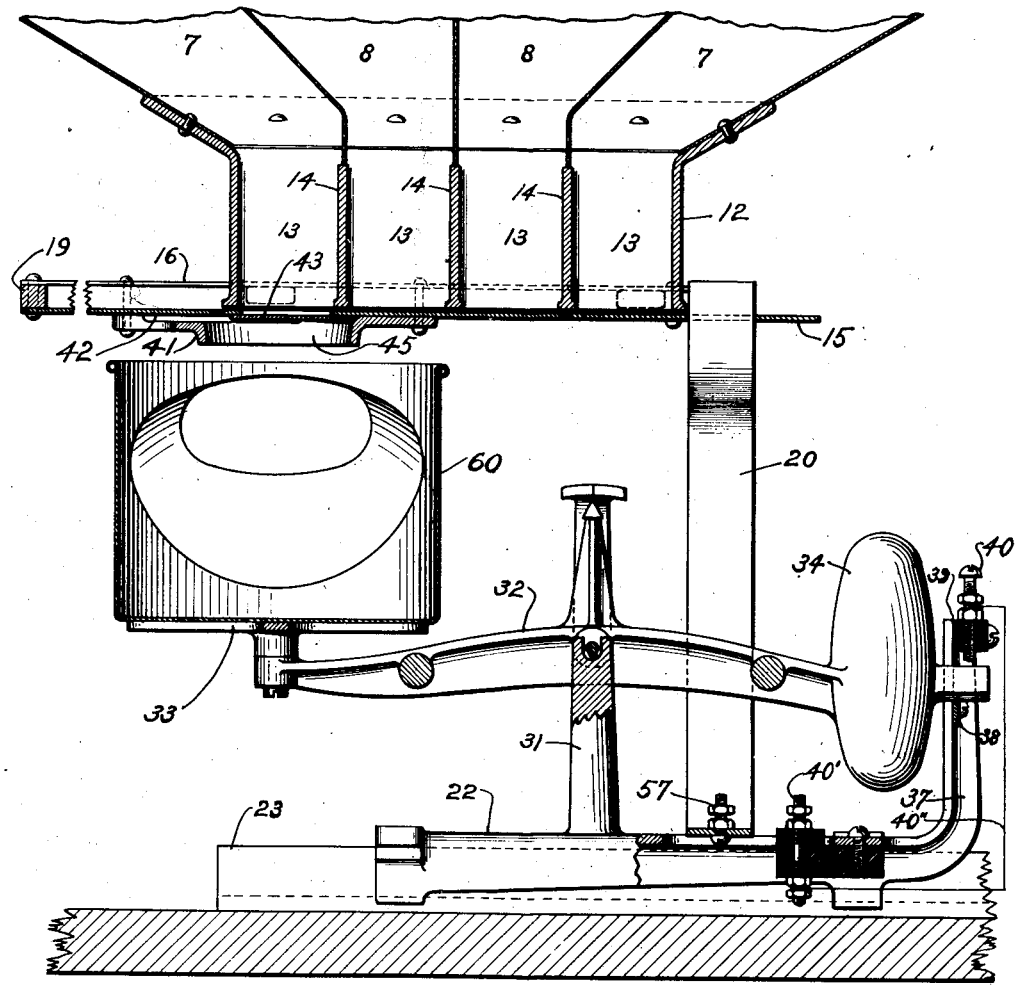
Figure 4:
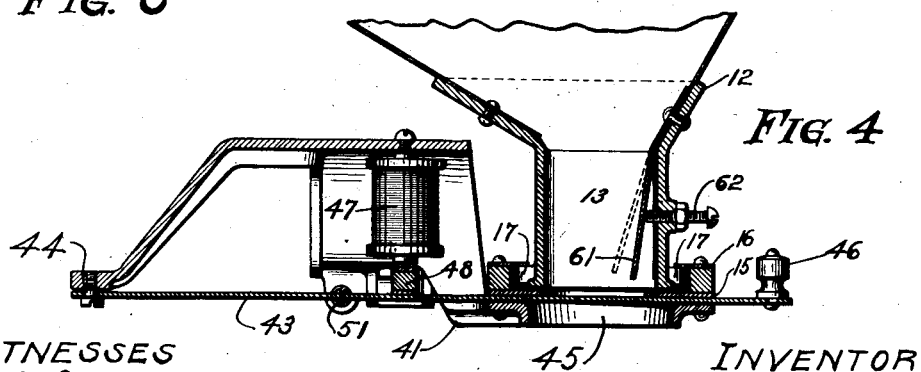
Figure 5:
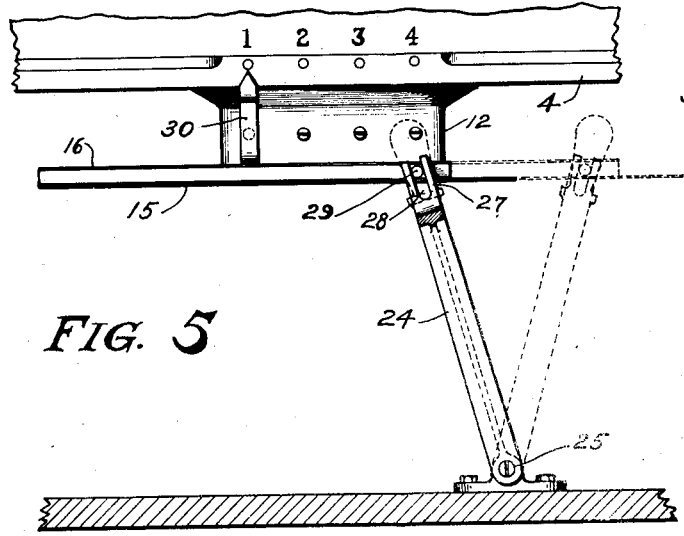
Figure 6:
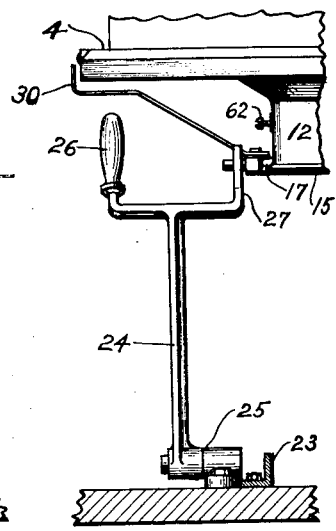
Figure 7:
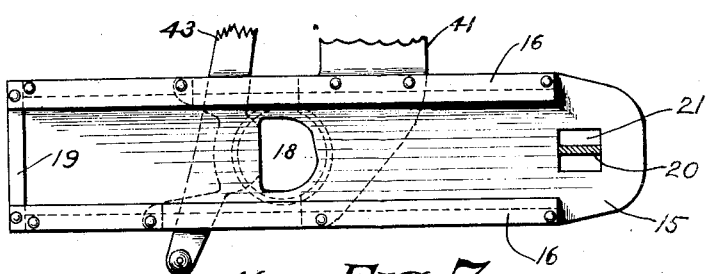
Figure 8:
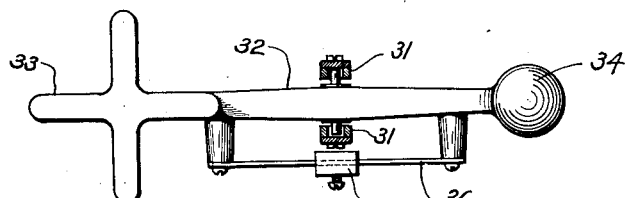
Figure 9:
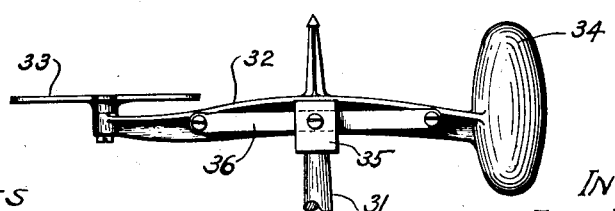
Figure 15:
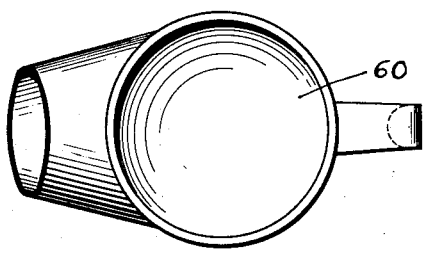
Figure 16:
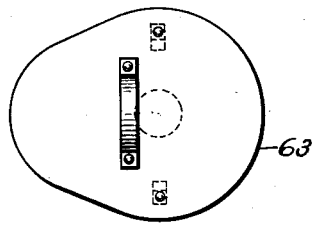
Figure 17:
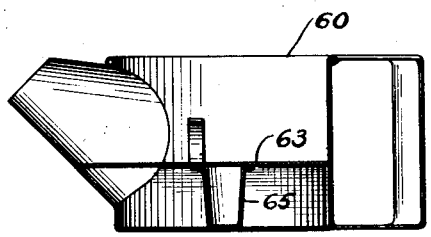
Figure 18:
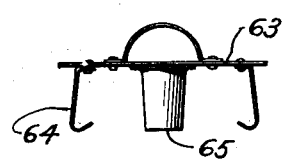
Figure 19:
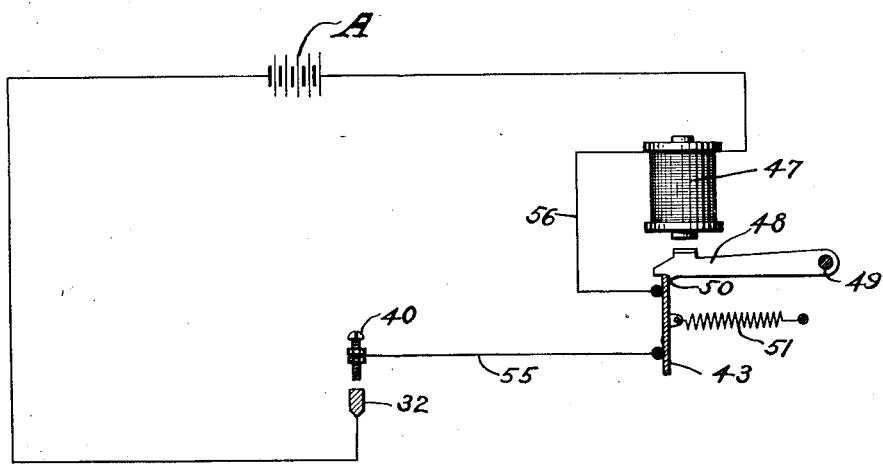

In the accompanying drawings forming part of this specification, Figure 1 is a front elevation of a weighing scale and cabinet embodying my invention, Fig. 2 is an end view of the same, Fig. 3 is a detail sectional view showing the manner of mounting the scale beam and the position of the scoop beneath the hopper discharge opening, Fig. 4 is a detail sectional view of the hopper valve or shutter, Fig. 5 is a detail view showing the mechanism for operating the hopper slide, Fig. 6 is a view taken at right angles substantially to the view point of Fig. 5, Fig. 7 is a detail view of the hopper slide, Fig. 8 is a plan view, showing the scale beam and the means for balancing the same, Fig. 9 is a side view of the same, Fig. 10 is a detail view showing the hopper slide or valve in its open and closed position, Fig. 11 is a sectional view on the line x—x of Fig. 10, Fig. 12 is an end view of the scale, showing the beam and contact point and the binding posts for the electric connections, Figs. 13 and 14 are sectional views on the line y—y of Fig. 10, showing the open and closed position of the shutter, Fig. 15 is a plan view of the scoop, Fig. 16 is a top view of a removable bottom for the scoop, Fig. 17 is a sectional view of the scoop, showing the removable bottom in place to adapt the scoop for weighing half a pound, Fig. 18 is a view of the removable bottom and the means for supporting it, Fig. 19 is a diagrammatic view of the magnet controlling the movement of the valve or shutter and the electric circuit, Fig. 20 is a sectional view of the hopper, Fig. 21 is a longitudinal sectional view on the line w—w of Fig. 22, Fig. 22 is a horizontal sectional view.

In the drawing, 2 represents a suitable base or table having standards 3 thereon supporting a hopper casing 4. This hopper casing has a cover 5 and transparent panels 6 and is divided interiorly into a series of vertical compartments 7—7 and 8—8 by walls, 9, 10, and 11. The compartments 7—7 and 8—8 have a hopper bottom secured to a casting 12 provided with discharge openings 13 separated from one another by walls 14 and communicating respectively with the compartments above. A slide 15 has plates 16 secured thereto adapted to rest and slide on flanges 17 which are provided on each side of the casting 12. This slide 15 is capable of movement back and forth beneath the hopper openings and is provided with a single opening 18 through which the material is discharged from the hopper into the scoop beneath. A stop 19 is provided at one end of the slide to limit the movement of the slide in one direction and a standard 20 projects through an opening 21 in the other end of the slide to limit its movement in the opposite direction. The standard 20 is mounted upon a carriage 22 slidable upon a track 23. To operate the slide I prefer to provide a lever 24 pivoted at 25 on the table or counter and having a hand grip 26 and an arm 27 at its upper end. The hand grip is in position to be conveniently grasped by the clerk to set the slide in the proper position beneath the hopper opening and the arm 27 has a slot 28 in its upper end to receive a pin 29 on the slide, the arm sliding on the pin as the lever 24 is oscillated and moving the slide back and forth beneath the hopper. The different compartments are designated by suitable numerals, as indicated in Fig. 5, and a pointer 30 is carried by the slide and is movable back and forth beneath the numerals so that the clerk can readily set the slide to open the passage to the desired compartment in the hopper. The carriage has a standard 31 mounted thereon supporting a beam 32 provided at one end with a platform 33 and at its opposite end with a weight 34. This weight is preferably stationary and a poise 35 is slidable on a bar or auxiliary beam 36 secured to the said beam. The weight 34 balances the weight of the platform, the scoop and its contents and is adapted to tilt and close the circuit, releasing the hopper valve when there is a little less than the desired weight in the scoop, the full weight being made up by the merchandise that has passed the valve and not yet fallen into the scoop when the beam is tilted, so that when the scoop is removed from the platform it will contain the full weight desired. I have found that this type of beam with the weighted end will not rise gradually but will move positively and quickly, and a quick, firm contact will be formed between the end of the beam and the contact screw. The desired balance of the beam may be readily obtained by the adjustment of the poise 35. The carriage 32 also has a standard 37 thereon provided with a fixed stop 38 limiting the downward movement of the beam and carrying an insulating block 39 above the beam, in which block a binding screw 40 is mounted. This screw is locked in the path of the beam so that when it is tilted by the weight at the opposite end of the beam the electric circuit will be closed to automatically trip the valve and shut off the discharge from the hopper, as I will now proceed to describe in detail.

A bracket 41 is secured to the underside of the slide. This bracket is spaced from the slide to form a guide-way 42 for the valve or shutter 43 that is pivoted at 44 on the bracket, said bracket also having an opening 45 which registers with the opening in the slide. The valve has a limited oscillating movement in its guideway and is provided with a finger grip 46 for convenience of operation. An electro-magnet 47 is mounted in said bracket and an armature 48 is pivoted at 49 and has a shoulder 50 adapted to engage and lock the valve 43 in its open position against the tension of a spring 51. When the clerk grasps the finger grip 46 and moves the shutter to an open position the armature 48 will drop down until the shoulder 50 engages the edge of the shutter, locking it in its open position. An insulating block 52 is mounted on said bracket and provided with contact springs 53 and 54. These springs are insulated from one another by the block 52 and one of them has an electric connection 55 with an insulated binding screw 40′ from which a conductor 40″ leads to the binding screw 40. The other contact spring is in circuit through a connection 56 with an electric magnet and a battery A and around to a binding post 57 that is mounted on the carriage and is in circuit with the beam 32. I prefer to provide the insulated binding screw 40′ and its connection with the screw 40 to avoid running a conductor to the screw 40 direct, as such a conductor would be conspicuous and present an unsightly appearance on the machine. The electric circuit is normally broken at two points, one between the springs 53 and 54 and the other between the beam 32 and the screw 40. An insulating block 58 is mounted on the valve 43 and has a conducting plate 59 thereon that is adapted to contact with the springs 53 and 54 and close the circuit between them when the valve is opened, the springs yielding sufficiently so that a good, rubbing contact is made by the plate 59 between them.

A hopper 60 is placed on the beam platform and is preferably of a size to contain a pound weight, assuming that the scale beam has been adjusted to tilt with that weight. The valve is then opened, allowing the tea, coffee, or other material to flow into the scoop. When the desired weight has been obtained the beam will tilt, closing the circuit between the beam and the contact screw 40. The circuit between the springs 53 and 54 had been previously closed when the valve was opened. As soon, therefore, as the beam contacts with the screw 40, the entire circuit will be closed, the electro-magnet energized to attract the latch armature, release the valve and allow the tension of the spring 51 to return it to its normal closed position, thereby immediately shutting off the flow from the hopper. As soon as the valve is released, the circuit will be broken between the springs 53 and 54 and consequently it will be immaterial whether the clerk removes the scoop from the scale immediately or not. The circuit being automatically broken as soon as the valve is closed, there will be no further drain on the battery.

I prefer to provide a spring plate 61 in each passage in the hopper casting, with set screws 62 arranged to engage the plates and press them inwardly to reduce the area of the discharge passages according to the desired flow of the material. As soon as the screws are withdrawn the tension of the plates will return them to their normal position. These plates I regard as an important feature of my invention, for by their use I am able to regulate to a nicety the volume of feed from the hopper. I also prefer to provide in connection with the scoop a false bottom or floor 63, supported by suitable legs 64 and 65 and adapted to be inserted into the scoop when it is desired to weigh less than a pound. The device herein shown adapts the scoop for weighing half a pound and by varying the length of the legs the removable floor may be utilized so that a third of a pound may be weighed or a quarter, if desired. Generally, however, scoops of different sizes will be employed for the different weights of merchandise.

I claim as my invention:—

1. The combination, with a hopper having a series of compartments and a series of feed openings leading therefrom, of a slide having a feed opening adapted to register with any one of said hopper feed openings, a normally closed valve for said slide feed opening, a weighing scale having a scoop, and a lever for moving said slide and said scale back and forth beneath said hopper feed openings to adjust said scoop beneath said hopper openings.

2. The combination, with a hopper having a series of compartments and a series of feed openings leading therefrom, of a slide having a single feed opening adapted to register with any one of said hopper feed openings, a valve carried by said slide for normally closing said feed opening, a spring normally holding said valve in its closed position, a weighing scale having a scoop and slidably arranged beneath said hopper feed openings, and means for moving said slide and said scale back and forth beneath said hopper feed openings, for the purpose specified.

3. The combination, with a hopper having a series of compartments and a series of feed openings leading therefrom and a slide having a single feed opening adapted to register with any one of said hopper feed openings, a valve for said slide feed opening, a spring for normally holding said valve in its closed position, means for temporarily locking said valve in its open position, a scale having a scoop beneath said hopper feed opening, means for moving said slide to allow the discharge from said hopper into said scoop, and means for releasing said valve when the desired weight has been delivered to said scoop.

4. The combination, with a hopper having a series of compartments and a series of feed openings leading therefrom, of a slide having a feed opening adapted to register with any one of said hopper feed openings, an oscillating valve mounted on said slide, a spring connected with said valve for normally holding it in its closed position, an armature having means for engaging said valve and locking it in its open position, a scale having a beam and scoop beneath said hopper feed openings and capable of adjustment to receive the material from any one of said openings, and an electric circuit having a magnet arranged to attract said armature and release said valve when said scale beam is tilted by the weight of the material in said scoop.

5. The combination, with a hopper having a series of compartments vertically arranged therein and partition walls separating said compartments from one another, each compartment having an independent feed opening, a slide arranged to reciprocate beneath said feed openings and having a feed opening therein and a valve therefor, a spring normally holding said valve in its closed position, means for reciprocating said slide beneath said hopper feed openings, means for locking said valve in its open position, a scale, including a weighing beam and scoop arranged beneath said hopper feed openings, and means rendered operative by the tilting of the scale beam under the weight in said scoop for releasing said valve.

6. The combination, with a hopper having a series of compartments and a series of feed openings leading therefrom, of a slide having a feed opening adapted to register with any one of said hopper feed openings, a normally closed valve for said slide feed opening, a reciprocating carriage, a weighing scale mounted thereon and including a scale beam and scoop, means connecting said slide with said carriage, means for reciprocating said slide and carriage simultaneously, means for locking said valve in its open position, and means rendered operative by the tilting of said scale beam for releasing said valve.

7. The combination, with a hopper having a series of compartments and a series of feed openings leading therefrom, of a slide having a feed opening adapted to register with any one of said hopper feed openings, a normally closed valve, an armature for locking said valve in its open position, an electric circuit having a magnet arranged to attract said armature to release said valve, a scale having a beam and scoop beneath said hopper feed openings, electric conductors connected with said magnet and said beam, the circuit being normally broken at said beam, contact springs in the electric circuit, and a circuit closing means carried by said valve and arranged to close the circuit between said springs when said valve is opened.

8. The combination, with a hopper having a series of compartments and a series of feed openings leading therefrom, of a slide having a single feed opening therein adapted to register with any one of said hopper feed openings, a valve normally closing said slide feed opening, a sliding carriage, a scale having a weighing scoop mounted thereon, means connecting said carriage and said slide, and means for moving said carriage and slide back and forth beneath said hopper feed openings, for the purpose specified.

9. The combination, with a hopper having a series of compartments and a series of feed openings leading therefrom, of a slide having a feed opening adapted to register with any one of said hopper feed openings, a sliding carriage, a weighing scale mounted thereon, a standard mounted on said carriage and engaging said slide and means for moving said carriage and said slide simultaneously.

10. The combination, with a hopper having a series of compartments and a series of feed openings leading therefrom, of a slide having a feed opening adapted to register with any one of said hopper feed openings, a valve for said slide feed opening, a movable carriage, a weighing scale mounted thereon, means connecting said carriage and said slide for simultaneous movement, means for moving said carriage and slide, means for locking said valve in its open position, and an electric circuit arranged to be closed by the tilting of said weighing scale to release said valve automatically.

11. The combination, with a hopper having a series of compartments and a series of feed openings leading therefrom, of a slide having a single feed opening adapted to register with any one of said hopper feed openings, a valve normally closing said slide feed opening, means for locking said valve in its opened position, a weighing scale, and an electric circuit arranged to be closed by the tilting of said weighing scale to release said valve.

12. The combination, with a hopper having a series of compartments, a series of feed openings leading therefrom, and a slide having a single feed opening adapted to register with any one of said hopper feed openings, a valve carried by said slide for normally closing said feed opening, means for locking said valve in its open position, a weighing scale having a scoop slidably arranged beneath said hopper feed openings, and means actuated by the tilting of the weighing scale beam for releasing said valve to close said slide feed opening.

In witness whereof, I have hereunto set my hand this 13" day of July, 1911.

JOHN L. SAYLOR.

Witnesses:
GENEVIEVE E. SORENSEN,
C. H. REHFUSS.